US007527440B1

(12) United States Patent
White

(10) Patent No.: US 7,527,440 B1
(45) Date of Patent: May 5, 2009

(54) TRIANGULAR VEHICLE LIGHT APPARATUS WITH CAMERA

(76) Inventor: Osborn L. White, 8324 Championship Dr., Apt. 204, Memphis, TN (US) 38125

( * ) Notice: Subject to any disclaimer, the term of this patent is extended or adjusted under 35 U.S.C. 154(b) by 368 days.

(21) Appl. No.: 11/446,418

(22) Filed: Jun. 5, 2006

(51) Int. Cl.
 *G03B 17/00* (2006.01)
(52) U.S. Cl. .................. 396/419; 348/148; 348/151; 315/82
(58) Field of Classification Search .......... 396/419, 396/427, 429; 352/132; 362/11, 66; 348/147, 348/148, 143
 See application file for complete search history.

(56) References Cited

U.S. PATENT DOCUMENTS

| 1,266,554 | A | 5/1918 | Coleman et al. |
| 6,296,382 | B1 | 10/2001 | Hamelbeck |
| 6,439,753 | B1 | 8/2002 | Sumada et al. |
| 6,481,865 | B2 | 11/2002 | Woerner et al. |
| 6,509,832 | B1 * | 1/2003 | Bauer et al. ............... 340/425.5 |
| D472,001 | S | 3/2003 | Pan et al. |
| 6,535,242 | B1 * | 3/2003 | Strumolo et al. ............ 348/148 |
| D484,259 | S * | 12/2003 | Horowitz ..................... D26/28 |
| 6,765,607 | B2 * | 7/2004 | Mizusawa et al. ........... 348/118 |
| 7,301,466 | B2 * | 11/2007 | Asai ........................... 340/632 |
| 7,353,086 | B2 * | 4/2008 | Ennis ........................... 701/1 |
| 2002/0167817 | A1 | 11/2002 | Tatsukawa |
| 2006/0044818 | A1 * | 3/2006 | Amagasa ..................... 362/514 |
| 2007/0278406 | A1 * | 12/2007 | Haug ....................... 250/338.1 |

OTHER PUBLICATIONS

Toucan Industries, 2005 Catalog, pp. 8-9, Honda Civic 2DR (2001-2003) and Honda Prelude (1992-1996).*

* cited by examiner

*Primary Examiner*—W. B. Perkey
*Assistant Examiner*—Linda B Smith

(57) ABSTRACT

A triangular vehicle light apparatus with camera, the invention provides both front and rear light assemblies. Both assemblies have cameras, preferably one in each of the low beams of the headlights and one in each of the signal lights of the rear lights. A video screen is provided for viewing the images of the cameras, the screen for mounting in a dash or instrument cluster of a vehicle. A control is provided for camera and viewing control.

8 Claims, 3 Drawing Sheets

TRIANGULAR VEHICLE LIGHT APPARATUS WITH CAMERA

BACKGROUND OF THE INVENTION

Concerns in driving a vehicle, whether in day or night, extend farther than simply road visibility, although that most certainly is a greater concern at night. Headlights and taillights must not only assist drivers in clear vision both ahead and behind, but should also be stylish. Few consumers are not concerned with the appearance of their vehicles. Beyond visibility and style, there exists a need for visually recording driving events. Determining the cause of accidents is but one reason for doing so. A need exists to provide visually recordings of both front and rear events, while at the same time offering unique style and functionality. The present invention fills these needs.

FIELD OF THE INVENTION

The present invention relates to vehicle headlights and taillights and more specifically to a triangular vehicle light apparatus with a camera, for both headlight and taillight assemblies of vehicles.

DESCRIPTION OF THE PRIOR ART

The prior art focuses on various headlight and taillight designs but does not disclose a triangular design with the unique advantages of the present invention. Examples of prior art include the following:

U.S. Pat. No. 2002/0167817A1 issued to Tatsukawa on Nov. 14, 2002 provides a vehicular headlamp for controlling light distribution and does not delve into the realm of the current invention.

U.S. Pat. No. 6,296,382B1 issued to Hamelback on Oct. 2, 2001 reveals a multi-chamber lamp for vehicles which is focused on shielding.

U.S. Pat. No. 6,481,865B2 issued to Woerner et al on Nov. 19, 2002 provides a headlight device for vehicles for producing light bundles with different characteristics.

While the above-described devices fulfill their respective and particular objects and requirements, they do not describe a triangular vehicle light apparatus with camera that provides for the advantages of the present invention. Therefore, a need exists for an improved triangular vehicle light apparatus with camera. In this respect, the present invention substantially departs from the conventional concepts and designs of the prior art.

SUMMARY OF THE INVENTION

The general purpose of the triangular vehicle light apparatus with camera, described subsequently in greater detail, is to provide a triangular vehicle light apparatus with camera which has many novel features that result in an improved triangular vehicle light apparatus with camera which is not anticipated, rendered obvious, suggested, or even implied by prior art, either alone or in combination thereof.

In view of the foregoing disadvantages inherent in the known types of vehicle light devices now present in the prior art, the improved triangular vehicle light apparatus with camera overcomes the above-mentioned disadvantages and drawbacks or the prior art.

To attain this, the present invention essentially comprises triangular headlight and taillight assemblies. While there are preferable locations of the components therein, the locations preferred are not mandatory. The headlight assemblies preferably position the triangular frames such that a horizontal side of the triangular is on top. Placing the low beam in the lateral position is preferred, with the high beam in the medial position. The low beam preferably houses the camera. The camera is preferably disposed in the outer center of the low beam. The signal light is therefore on the bottom of the triangle. Obviously, with a motorcycle or other vehicle unlike a car, this arrangement may be altered. The taillight assemblies are illustrated with the cameras in the signal lights also. The taillight assemblies are illustrated in a stylish arrangement which features a side of the triangle in a medial vertical disposition. The signal light is in the lateral position, with the brake light disposed above the reverse light, both in the medial position. This arrangement is not mandatory. The control for the cameras' is preferably disposed within a control as illustrated, which is on a stalk proximal to the steering of the vehicle. This places control in a convenient ergonomic position for a driver.

The control uses electrical functions well known in the arts. The control provides for selective camera operation and for selective viewing, on the screen, of the cameras, such as in front or rear, as example. The video screen of the invention is preferably disposed either in the dash as illustrated or within an instrument cluster so that viewing is convenient. Motorcycles, as example, might well position the video within an instrument cluster as a conventional dash is not a normal part of a motorcycle. The invention is provided with typical electric connections for attachment to a vehicle, or the invention is offered as an original equipment device.

These together with additional objects, features and advantages of the improved triangular vehicle light apparatus with camera will be readily apparent to those of ordinary skill in the art upon reading the following detailed description of presently preferred, but nonetheless illustrative, embodiments of the improved triangular vehicle light apparatus with camera when taken in conjunction with the accompanying drawings. In this respect, before explaining the current embodiments of the improved triangular vehicle light apparatus with camera in detail, it is to be understood that the invention is not limited in its application to the details of construction and arrangements of the components set forth in the following description or illustration. The invention is capable of other examples and of being practiced and carried out in various ways.

It is also to be understood that the phraseology and terminology employed herein are for purposes of description and should not be regarded as limiting.

Thus has been broadly outlined the more important features of the triangular vehicle light apparatus with camera so that the detailed description thereof that follows may be better understood and in order that the present contribution to the art may be better appreciated.

Those skilled in the art will appreciate that the conception upon which this disclosure is based may readily be utilized as a basis for the design of other structures, methods and systems for carrying out the several purposes of the triangular vehicle light apparatus with camera. It is therefore important that the claims be regarded as including such equivalent constructions insofar as they do not depart from the spirit and scope of the present invention.

DETAILED DESCRIPTION OF THE DRAWINGS

With reference now to the drawings, and in particular FIGS. 1 through 5 thereof, example of the employing the principles and concepts of the present invention and generally designated by the reference number 10 will be described.

Figure 1:
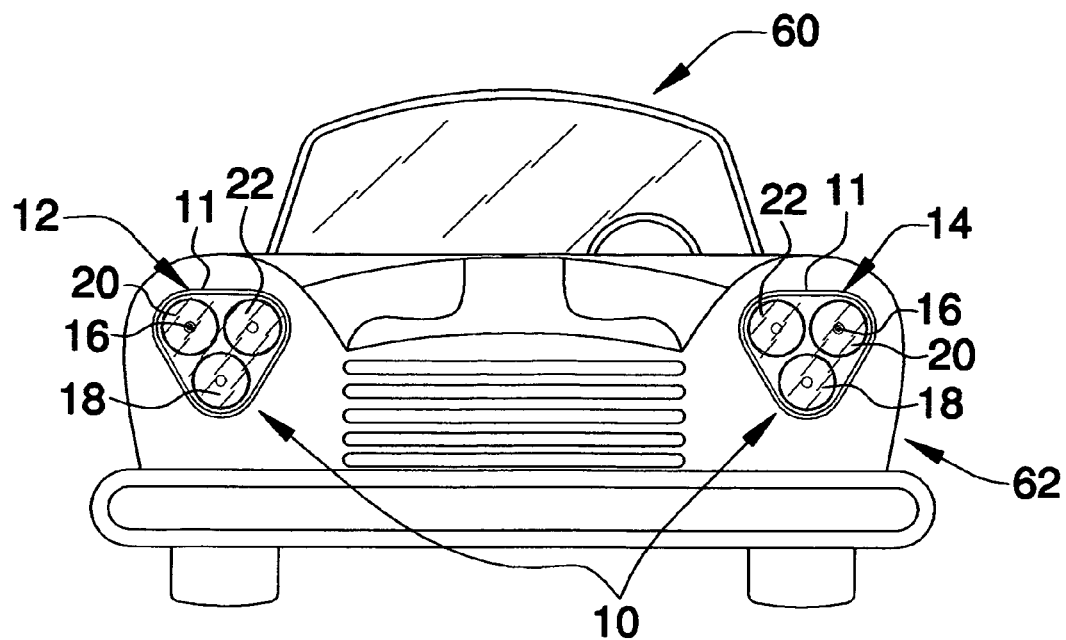
FIG. 1 is a front elevation of a vehicle with the invention headlight assemblies installed.
Figure 2:
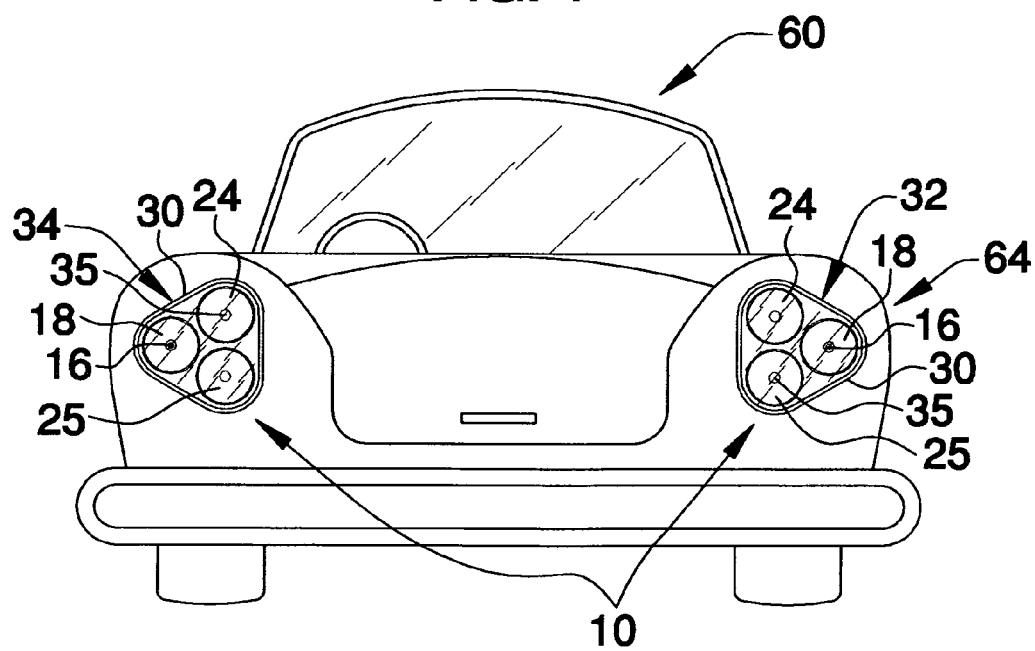
FIG. 2 is a rear elevation of a vehicle with the invention taillight assemblies installed.

Referring to FIGS. 1 and 2, the invention 10 is a triangular vehicle light apparatus with camera 16, preferably for both the right headlight assembly 12 and left headlight assembly 14. The preferred example of the invention 10 also provides the right taillight assembly 32 and the left taillight assembly 34. The camera 16 is preferably fitted within each of the right headlight assembly 12 and left headlight assembly 14. The camera is preferably fitted within the center of the low beam light 20. The camera 16 is disposed in front of the bulb 35. Each of the right headlight assembly 12 and left headlight assembly 14 is comprised of a triangular headlight frame 11. A high beam light 22 with is fitted within the headlight frame 11. A low beam light 20 is fitted within the headlight frame 11. A signal light 18 is fitted within the headlight frame 11. When used with a vehicle 60 illustrated (car), the invention 10 preferably further comprises the right taillight assembly 32 and the left taillight assembly 34. Each comprises a triangular taillight frame 30. A signal light 18 is within each triangular frame 30. A brake light 24 is disposed within each taillight frame 30. A reverse light 25 is disposed within the taillight frame 30. The camera 16 is disposed within the taillight frame 30, preferably within the signal light 18.

Figure 5:
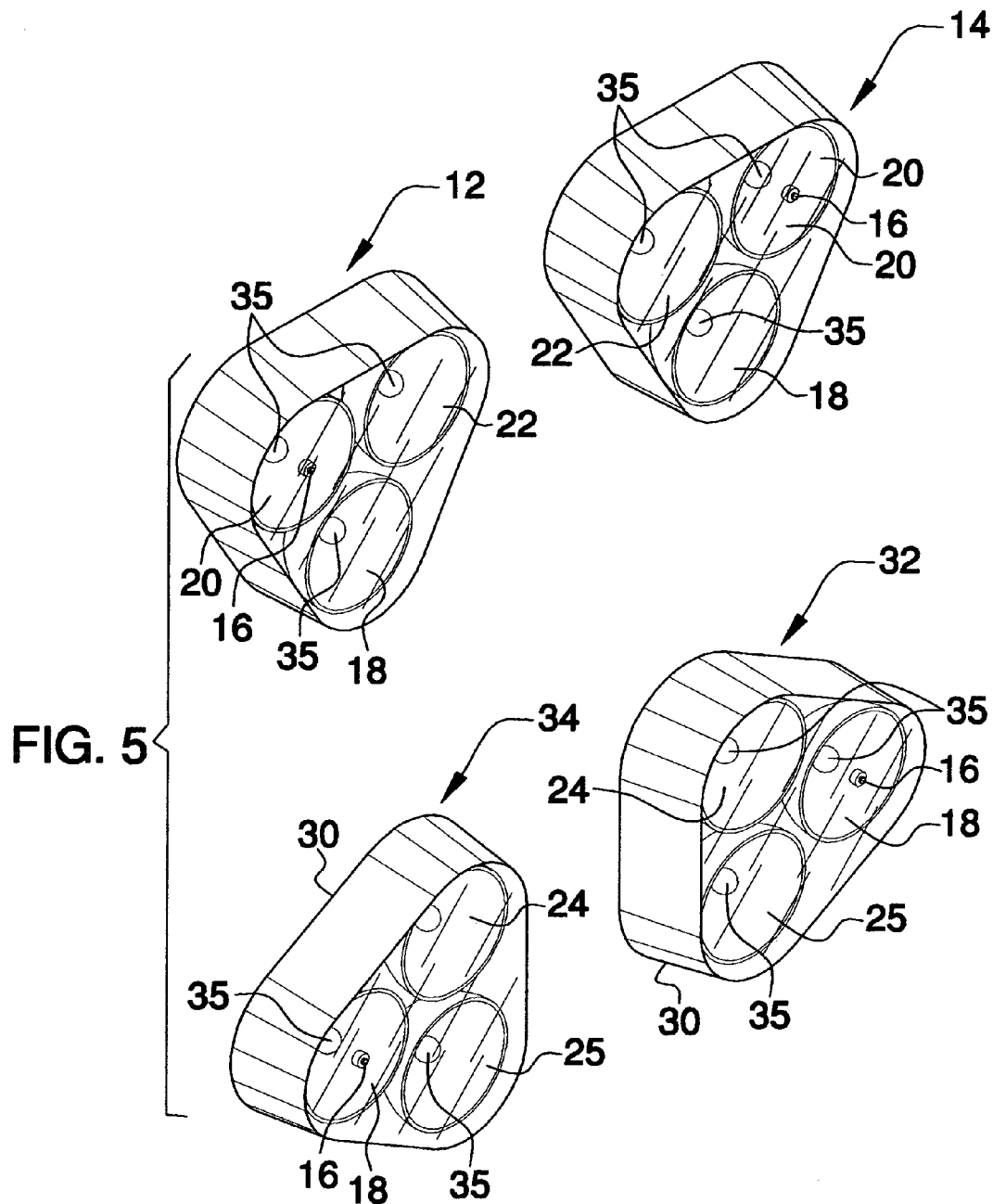
FIG. 5 is a perspective view of the headlight and taillight assemblies of the invention.

Referring to FIGS. 2 and 5, the triangular headlight frames 11 of the invention 10 illustrate the preferred arrangement of the components within. Preferably, the invention 10 is arranged to feature a side of the triangle in the upper horizontal position. The components within are preferably arranged such that the high beam light 22 of the right headlight assembly 12 is to the medial side of the horizontal top side of the triangular headlight frame 11. This preferred arrangement disposes the low beam light 20 to the lateral top side of the horizontal top side of the triangular headlight frame 11 of the right headlight assembly 12. The signal light 18 is therefore preferably disposed in the bottom of the triangular headlight frame 11. Preferably, the right headlight assembly 12 and the left headlight assembly 14 position the camera 16 in each low beam light 20. The left headlight assembly 14 preferably disposes the components in a like manner, with the low beam light 20 disposed laterally also and the high beam light 22 disposed medially. The right taillight assembly 32 preferably disposes the signal light 18 laterally, with the brake light 24 and the reverse light 25 disposed medially. This arrangement of components is selective. Preferably, the camera 16 of the right taillight assembly 32 and the left taillight assembly 34 is disposed centrally within the signal light 18.

Figure 3:
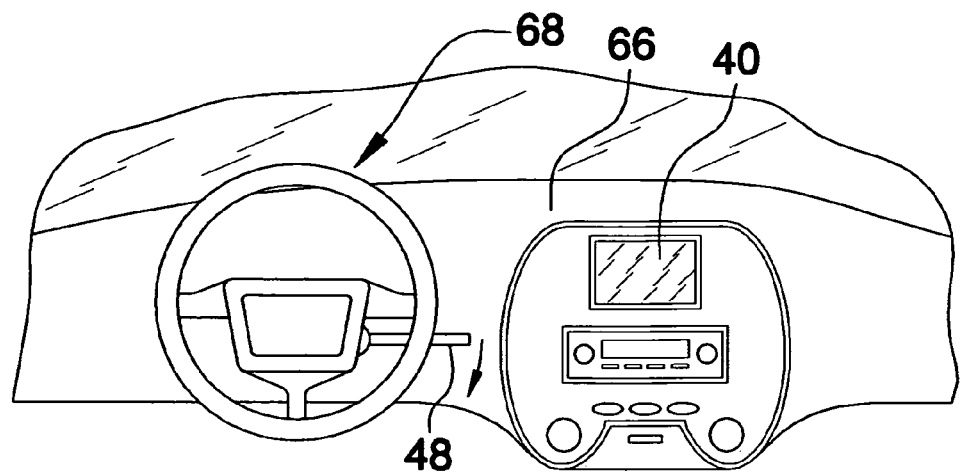
FIG. 3 is an elevation of the vehicle dash with the invention video screen installed.
Figure 4:
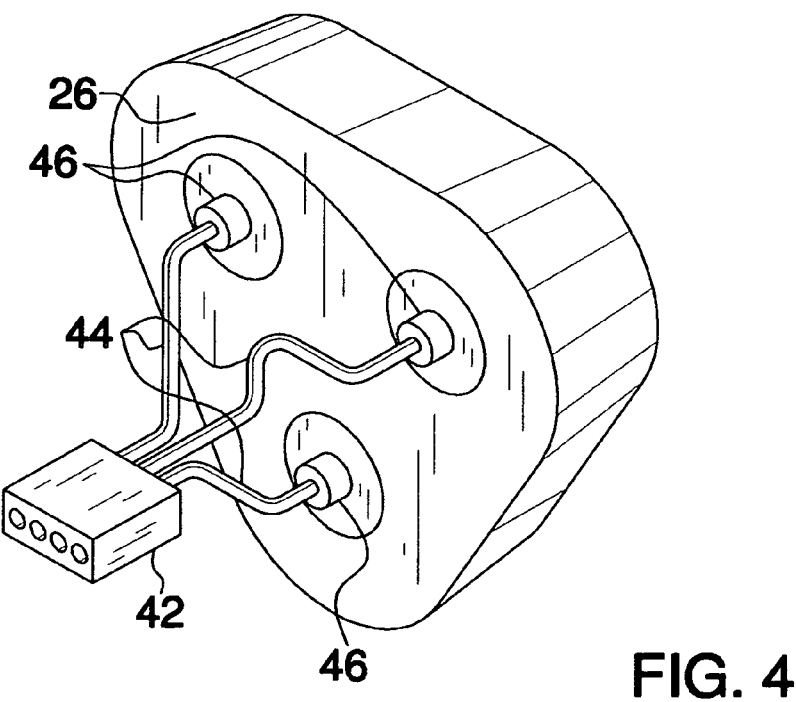
FIG. 4 is a perspective view of the triangular frame.

Referring to FIGS. 3 and 4, the video screen 40 communicates with the cameras 16 of the right headlight assembly 12, the left headlight assembly 14, the right taillight assembly 32, and the left taillight assembly 34. The video screen 40 is for viewing the cameras' 16 images. Viewing control is provided, preferably, by the control 48 on a stalk from or near the steering 68 of the vehicle 60. The control 48 provides for selective activation of the cameras 16 as well as selective control of chosen viewing. The control 48 uses well-known available electronic controls. The invention 10 is provided with connections for connecting the invention 10 to an electrical system of the vehicle 60. Each of the headlight and taillight frames further comprises a frame back 26. Each frame back 26 contains a trio of bulb sockets 46. A bulb socket 46 is provided for each of the signal light 18, the low beam 20, the high beam 22, the brake light 24, and the reverse light 25. Each bulb socket 46 is connected to a modular plug 42 via connecting wires 44.

With respect to the above description then, it is to be realized that the optimum dimensional relationships for the parts of the triangular vehicle light apparatus with camera, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A triangular vehicle light apparatus with camera, comprising, in combination:
    at least one headlight assembly, the headlight assembly comprising:
        a triangular headlight frame;
        a high beam light within the headlight frame;
        a low beam light within the headlight frame;
        a signal light within the headlight frame;
        a camera within one of the lights of the headlight frame;
    means for selective activation of the camera;
    a video screen communicating with the camera, the video screen for viewing the camera's images;
    means for connecting the apparatus to an electrical system of the vehicle;
    wherein a horizontal of the triangular headlight frame is disposed on a top of the frame;
    wherein the low beam light is to a lateral side within the top horizontal of the headlight frame;
    wherein the high beam light is to a medial side within the top of the headlight frame;
    wherein the camera is within the low beam light.

2. The apparatus in claim 1 wherein the video screen is of a design to mount within a dash of the vehicle.

3. The apparatus in claim 1 wherein the video screen is of a design to mount within an instrument cluster of the vehicle.

4. A triangular vehicle light apparatus with camera, comprising, in combination:
    at least one headlight assembly, the headlight assembly comprising:
        a triangular headlight frame;
        a high beam light within the headlight frame;
        a low beam light within the headlight frame;

a signal light within the headlight frame;
a bulb socket for each of the high beam light, low beam light, and signal light;
a camera disposed within the low beam light of the headlight frame;
at least one taillight assembly, the taillight assembly comprising:
a triangular taillight frame;
a signal light within the taillight frame;
a brake light within the taillight frame;
a reverse light within the taillight frame;
a camera within the taillight frame;
a bulb socket for each of the signal light, brake light, and reverse light;
a video screen communicating with the cameras, the video screen for viewing the camera's images;
means for selective activation of the cameras;
means for connecting the apparatus to an electrical system of the vehicle;
wherein a horizontal of the triangular headlight frame is disposed on a top of the frame;
wherein the low beam light is to a lateral side within the top horizontal of the headlight frame;
wherein the high beam light is to a medial side within the top of the headlight frame;
wherein the camera is within the low beam light.

5. The apparatus in claim 4 wherein the video screen is mounted within a dash of the vehicle.

6. The apparatus in claim 4 wherein the video screen is mounted within an instrument cluster of the vehicle.

7. The apparatus in claim 5 wherein the camera in the taillight assembly is within the signal light.

8. The apparatus in claim 6 wherein the camera in the taillight assembly is within the signal light.

* * * * *